(12) United States Patent
Novitsky et al.

(10) Patent No.: US 6,391,295 B1
(45) Date of Patent: May 21, 2002

(54) ARTIFICIAL BAIT

(75) Inventors: Thomas J. Novitsky; Michael E. Dawson, both of East Falmouth; Erik J. Paus, Brewster, all of MA (US)

(73) Assignee: Associates of Cape Cod, Inc., Falmouth, MA (US)

( * ) Notice: Subject to any disclaimer, the term of this patent is extended or adjusted under 35 U.S.C. 154(b) by 0 days.

(21) Appl. No.: 09/695,061

(22) Filed: Oct. 25, 2000

Related U.S. Application Data
(60) Provisional application No. 60/161,408, filed on Oct. 25, 1999.

(51) Int. Cl.$^7$ ........................ A01N 25/08; A01K 85/00; A01K 79/00; A23K 1/04; A23K 1/18
(52) U.S. Cl. ........................ 424/84; 424/405; 424/408; 424/409; 424/529; 424/530; 424/531; 424/538; 43/42; 426/1; 426/802; 426/805
(58) Field of Search ........................ 424/84, 405, 408, 424/409, 529, 530, 531, 538; 43/42; 426/1, 802, 805

(56) References Cited

U.S. PATENT DOCUMENTS

| | | | |
|---|---|---|---|
| 3,915,805 A | 10/1975 | Levin | 195/103.5 R |
| 3,944,391 A | 3/1976 | Harris et al. | 23/230 B |
| 4,038,147 A | 7/1977 | Reno | 195/103.5 R |
| 4,107,077 A * | 8/1978 | Sullivan, Jr. et al. | 435/18 |
| 4,201,865 A | 5/1980 | Guzzi et al. | 560/121 |
| 4,221,866 A | 9/1980 | Cotter | 435/4 |
| 4,273,557 A | 6/1981 | Juranas | 23/230 B |
| 4,276,050 A | 6/1981 | Firca et al. | 23/230 B |
| 4,463,018 A | 7/1984 | Carr | 426/1 |
| 4,731,247 A | 3/1988 | Wolford et al. | 426/1 |
| 4,826,691 A | 5/1989 | Pronchnow | 426/1 |
| 5,133,959 A | 7/1992 | Kumins | 424/84 |

OTHER PUBLICATIONS

Ho, B. et al., "A tetrodotoxin neutralizing system in the haemolymph of the horseshoe crab, *Carcinoscorpius rotundicauda*," Toxicon, vol. 32(7), 1994, pp. 75–762.*

Chemical Abstracts 69:9114 (1968).*

Quigley, J.P. et al., "An endopeptidase inhibitor, similar to mammalian alpha2–macroglobulin, detected in the hemolymph of an invertebrate, Limulus polyphemus," The Journal of Biological Chemistry, vol. 258(13), Jul. 1983, pp. 7903–7906.*

"Focus on Research," *Hazleton Standard–Speaker*, p. 19, Walser, J.N., et al., Publishers, (Oct. 21, 1999).

Jamison, K., *Hard Times for Horseshoe Crabs*, Outdoor Delaware Magazine, May 1998), at http://www.state.de.us/facts/outdoor/horecrab.htm.

McKeever Targett, N., University of Delaware Graduate College of Marine Studies, (Jun. 1998), at http://www.udel.edu/peggy/ntargett.htm.

Industrial Grain Products, "This is IGP," (Oct. 11, 2000), at http://www.industrialgrain.com/thisis.htm.

Industrial Grain Products, "Material Safety Data," (Feb. 23, 2000), at http://www.industrialgrain.com/msds.htm.

STN Database, Registry Search on "Chemical Abstracts Registry No. 9005–25–8," (Date Accessed: Oct. 10, 2001), Chemical Abstract Service, American Chemical Society.

* cited by examiner

*Primary Examiner*—John Pak
(74) *Attorney, Agent, or Firm*—Sterne, Kessler Goldstein & Fox, P.L.L.C.

(57) ABSTRACT

The present invention relates to an artificial bait for marine animals, comprising cell-free hemolymph of a horseshoe crab. The cell-free hemolymph of the horseshoe crab, which is the byproduct from the manufacture of Limulus Amebocyte Lysate (LAL), is an excellent attractant to be used in artificial baits for marine animals. The baits according to the invention attract the target marine animals better than the horseshoe crab itself. Further, the baits of the invention seem to attract non-target game less than the target game. The present invention also relates to a method of preparing a bait comprising cell-free hemolymph of a horseshoe crab, and a method of attracting marine animals.

19 Claims, No Drawings

ARTIFICIAL BAIT

This application claim the benifit of U.S Provisional Aplication No. 60/161,408, files on Oct. 25, 1999.

BACKGROUND OF THE INVENTION

1. Field of the Invention

The invention relates to a bait for marine animals. Accordingly, the present invention relates to an artificial bait for marine animals, comprising cell-free hemolymph of the horseshoe crab. Further, the invention relates to a method of preparing the same, and a method of attracting marine animals.

2. Related Art

Horseshoe crabs (*Limulus polyphemus, Tachypleus tridentatus, T. gigas* and *Carcinoscorpius rolundicada*) have traditionally been used as bait for eels (*Anguilla rostrata*) and conch, whelk (*Busycon carica* and *B. canaliculatum*) as well as other fin fish and shellfish. Unfortunately, over fishing for bait use has seriously depleted the horseshoe crab populations in the last few years, both in Asia (Tachypleus and Carcinoscorpius species) and in the United States. In the United States, the situation is especially critical in the center of the range of the horseshoe crab, namely the Delaware and Chesapeake Bay regions. In 1990 it was estimated that there was a spawning population of 1,200,000 crabs in the Delaware Estuary. In 1995, according to an annual census in which volunteers count the number of spawners coming ashore during a peak, one day period, there were fewer than 200,000. The Atlantic States Marine Fisheries Commission (ASMFC) is currently formulating a Management Plan because of the concern about over fishing.

The eggs of the horseshoe crab provide critical food for migratory shorebirds. As a consequence from the over fishing of the horseshoe crabs, the number of migratory shorebirds, for example, on New Jersey's Delaware bay shoreline has declined precipitously since 1986, perhaps as much as 60%.

Further, the horseshoe crab is essential for the production of a critical biological reagent, Limulus Amebocyte Lysate (LAL) which is used worldwide as a pyrogen test for parenteral drugs, biological products, and medical devices. The use of LAL has been deemed critical by the United States Food and Drug Administration as well as other governmental agencies worldwide for the safety of pharmaceuticals.

The manufacture of LAL does not, however, result in the killing of horseshoe crabs. The crabs are bled under carefully controlled conditions and are returned alive to the ocean where they were collected. Unfortunately, the use of horseshoe crabs as bait has also threatened the LAL industry.

Applicants have developed an artificial bait for marine animals which attracts the game better than the horseshoe crab and does not involve killing the crab.

SUMMARY OF THE INVENTION

Applicants have discovered that the byproduct from the manufacture of LAL, the cell-free hemolymph of the horseshoe crab, is an excellent attractant to be used in artificial baits for marine animals. In fact, the baits containing cell-free hemolymph of the horseshoe crab attract the target marine animals better than the horseshoe crab itself. Further, the baits of the invention seem to attract non-target game less than the target game. Accordingly, the invention provides an artificial bait comprising cell-free hemolymph of the horseshoe crab.

The invention also provides a method of preparing an artificial bait for marine animals. The method comprises incorporating or enclosing a functionally effective amount of cell-free hemolymph of a horseshoe crab in a material or container capable of releasing the cell-free hemolymph when immersed in a marine environment. Another method comprises mixing a functionally effective amount of cell-free hemolymph of a horseshoe crab with a solid binder capable of releasing the cell-free hemolymph when immersed in a marine environment. A further method comprises absorbing a functionally effective amount of cell-free hemolymph of a horseshoe crab in a solid carrier capable of releasing the cell-free hemolymph when immersed in a marine environment.

The invention also provides a method of attracting marine animals wherein said method comprises connecting a bait containing cell-free hemolymph of the horseshoe crab as an attractant to a trap for marine animals and immersing the trap in a marine environment, whereby a functionally effective amount of the cell-free hemolymph is released into the marine environment.

It should be noted that a trap is intended to include all potential ways of catching marine animals. Thus, a trap can be, for example, a trot line, a weir, a wire cage, or a hook.

Additional embodiments and advantages of the invention will be set forth in part in the description as follows, and in part will be obvious from the description, or may be learned by practice of the invention. The embodiments and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Applicants have surprisingly discovered an alternative for using the horseshoe crab as bait which not only saves the horseshoe crab but makes use of the byproduct from the manufacture of LAL, the cell-free hemolymph of the horseshoe crab. Applicants found that cell-free hemolymph presented in a variety of manners in conventional traps for fin fish and shellfish can completely replace the use of the whole or cut pieces of horseshoe crabs. The bait containing cell-free hemolymph is easier to store, transport, and use than the horseshoe crab. Applicants also discovered that the bait according to the invention attracts the game better than the whole animal and seems to attract fewer numbers of non-target game. When compared to cut horseshoe crabs, the bait according to the invention showed less attraction for by-catch, in particular green crabs, when the bait was used in eel traps.

The use of the LAL hemolymph byproduct as an attractant in a bait eliminates the need to dispose of the hemolymph as a waste product. The cell-free hemolymph is totally biodegradable and does not pose a threat to the marine environment where it is used.

LAL is made from adult, i.e. sexually mature, horseshoe crabs. The crabs are bled by inserting a needle into the cardiac cavity and collecting the blood into a sterile container. Only a small portion of the blood is collected, usually no more than 30%. It is impossible to exsanguinate the animal due to the design of the circulatory system which is open type and there is no capillary connection for return.

Thus, most of the blood, hemolymph, is contained in the spongy tissue and is circulated by diffusion into the large arteries and pumped by a primitive heart. During bleeding for LAL production, only the large vessels are emptied. Since the diffusion from the tissue is slow to refill the major vessels, the bleeding process is finished quickly and over-bleeding is prevented.

The blood, i.e. the hemolymph, consists of cells, amebocytes, and plasma, i.e. the cell-free hemolymph. The cells when separated from the plasma are used to produce LAL. See U.S. Pat. Nos. 4,276,050; 4,273,557; 4,221,866; 4,201,865; 4,038,147; 3,944,391; and 3,915,805. One component of the cell-free hemolymph, hemocyanin, is the oxygen carrier for the horseshoe crab and can be purified and sold for research use. However, this use is small and, therefore, does not eliminate the problem of the disposition of the cell-free hemolymph as a waste product. The present invention provides a solution to this problem.

There are numerous possibilities for preparing a bait comprising cell-free hemolymph of a horseshoe crab. For example, the cell-free hemolymph can simply be frozen in a container, preferably in a tube, more preferably in a plastic-capped tube. The container is then connected to a trap. In a preferred embodiment, the container has small holes in the cap. Preferably, the holes are round and about 1.5 mm to about 2 mm in diameter. The slow diffusion of the cell-free hemolymph attracts the game. Preferably, the size of the container and holes are such that the container will last over a period of one to two days, which is the usual time between the trap checks by the fisherman. The advantage of this kind of a bait is that the animals in the trap cannot eat the bait which would result in a loss of the attractant. Frozen baits are also reasonably stable, and easy to store and transport.

It should be noted that a trap is intended to include all potential ways of catching marine animals. Thus, a trap can be, for example, a trot line, a weir, a wire cage, or a hook.

The cell-free hemolymph can be freeze-dried by methods known in the art. Freeze-dried hemolymph is stable at room temperature and is very light making storage and transport easy. The freeze-dried attractant can be placed, e.g., in a plastic or metal container which allows diffusion into the water for attracting game, but the bait itself is protected from being eaten by the animals in the trap. Also, semipermeable membranes, such as dialysis tubing, or sausage casings can be used. Further, non-permeable membranes can be used for baits containing freeze-dried hemolymph. In this case, the membranes may be punctured just prior to use to release the attractant.

Further, the cell-free hemolymph can be mixed with a solid binder to make a solid bait which releases the attractant slowly and is easy to store and transport. The solid binder can be a binding agent, e.g., sodium alginate gel, gelatin, agar gel, collagen-based glue, or Super Powder® (alpha-starch, Chemical Abstracts Registry Number 9005-25-8) produced by Industrial Grain Products.

Also, the cell-free hemolymph as such can also be placed in a semipermeable bag or container to form a bait that allows the release of the attractant. Another possibility is to absorb the cell-free hemolymph in an insoluble carrier, such as a sponge, a cowhide biscuit or an absorbent material, to form a bait that releases the attractant slowly.

The cell-free hemolymph can be coagulated by heating and the resulting solid attractant, after removing the water, can be used as such as a bait or in a container. The heating that is performed in temperatures from about 50 °C. up to about 80° C. causes coagulation but does not result in the loss of the ability of being an attractant.

Cell-free hemolymph of the horseshoe crab can be used as an attractant in baits disclosed in the art, for example, in U.S. Pat. Nos. 4,731,247 and 4,463,018.

The bait according to the invention should contain a functionally effective amount of cell-free hemolymph. A functionally effective amount means an amount sufficient to attract the target marine animal over a sufficient period of time. Suitable amount may be readily determined by the practitioner skilled in the art and is dependent on the type of the bait and the desired duration of use.

The method of attracting marine animals involves connecting a bait containing cell-free hemolymph of a horseshoe crab to a trap for marine animals and immersing the trap in a marine environment to release a functionally effective amount of the cell-free hemolymph into the marine environment. The bait can be connected to the trap by, for example, placing it in the trap or in the near distance of the trap, or by attaching it to the trap. One skilled in the art would recognize the baits suitable in the method of attracting marine animals of the present invention.

The cell-free hemolymph may be combined with one or more other attractants known in the art. Also, various additional ingredients, such as preservatives, stabilizers, flow enhancers and coloring agents, can be added to the cell-free hemolymph without diminishing the effect of the attractant. A preservative, a stabilizer or mixtures thereof are added to prevent the growth of biologically active species that lead-to spoilage. Examples of preservatives that can be used include Polysorbate (Tween) 20, 60, and 80, and potassium sorbate. Up to 3% sodium chloride can also been used. These preservatives are non-toxic to the marine environment or are biodegradable. Suitable attractant compositions can be prepared by methods known in the art, for example, in U.S. Pat. Nos. 5,133,959 and 4,826,691.

The present invention may be successfully practiced with any type of marine animal, including fin fish, such as eel, catfish, and shellfish, such as conch and whelk. For example, frozen baits have been successfully used in standard eel traps and baits comprising a sponge have been used in standard lobster traps and conch pots.

Those skilled in the art will recognize that while specific embodiments have been illustrated and described, various modifications and changes may be made without departing from the spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims. All publications, patent applications and patents cited herein are fully incorporated by reference.

What is claimed is:

1. An artificial bait for marine animals, wherein the bait comprises cell-free hemolymph of a horseshoe crab and a carrier, wherein the carrier is a material or container capable of releasing the cell-free hemolymph when immersed in a marine environment.

2. The bait according to claim 1, wherein the cell-free hemolymph is frozen.

3. The bait according to claim 2, wherein the frozen cell-free hemolymph is in a plastic cap tube, wherein the cap has holes.

4. The bait according to claim 1, wherein the cell-free hemolymph is freeze-dried.

5. The bait according to claim 1, wherein the bait is in the form of a solid bait comprising a solid binder.

6. The bait according to claim 5, wherein the solid binder is a binding agent.

7. The bait according to claim 6, wherein the binding agent is selected from the group consisting of sodium alginate gel, gelatin, agar gel, and collagen-based glue.

8. The bait according to claim 1, wherein the carrier is a semipermeable bag or container containing the cell-free hemolymph.

9. The bait according to claim 1, wherein the cell-free hemolymph solidified cell-free hemolymph obtained by heating cell-free hemolymph of a horseshoe crab to a temperature of about 50° C. to about 80° C. without the loss of the ability of being a marine animal attractant.

10. A method of preparing an artificial bait for marine animals, wherein the method comprises incorporating or enclosing a functionally effective amount of cell-free hemolymph of a horseshoe crab in a material or container capable of releasing the cell-free hemolymph when immersed in a marine environment.

11. The method according to claim 10, wherein the functionally effective amount of cell-free hemolymph is frozen in a plastic-capped tube.

12. The method according to claim 10, wherein the functionally effective amount of cell-free hemolymph is freeze-dried.

13. The method according to claim 10, wherein the functionally effective amount of cell-free hemolymph is a solidified cell-free hemolymph obtained by heating cell-free hemolymph of a horseshoe crab to a temperature of about 50° C. to about 80° C. without the loss of the ability of being a marine animal attractant.

14. The method according to claim 12 or 13, wherein the material is a semipermeable membrane.

15. A method of preparing an artificial bait for marine animals, wherein the method comprises mixing a functionally effective amount of cell-free hemolymph of a horseshoe crab with a solid binder capable to form a solid bait capable of releasing the cell-free hemolymph when immersed in a marine environment.

16. A method of attracting marine animals, wherein the method comprises connecting a bait comprising cell-free hemolymph of a horseshoe crab as an attractant to a trap for marine animals and immersing the trap in a marine environment, whereby a functionally effective amount of the cell-free hemolymph is released into the marine environment and the animals are attracted.

17. The method according to claim 16, wherein the bait is placed in the trap.

18. The method according to claim 16, wherein the bait is attached to the trap.

19. An artificial bait for marine animals, wherein the bait comprises solidified cell-free hemolymph of a horseshoe crab obtained by heating cell-free hemolymph of a horseshoe crab to a temperature of about 50° C. to about 80° C. without the loss of the ability of being a marine animal attractant, and a carrier, wherein the carrier is a material or container capable of releasing the cell-free hemolymph when immersed in a marine environment.

* * * * *

UNITED STATES PATENT AND TRADEMARK OFFICE
CERTIFICATE OF CORRECTION

PATENT NO. : 6,391,295 B1
DATED : May 21, 2002
INVENTOR(S) : Novitsky et al.

It is certified that error appears in the above-identified patent and that said Letters Patent is hereby corrected as shown below:

Column 1,
Line 3, please delete "benifit" and insert therein -- benefit --.
Line 4, please delete "Aplication" and insert therein -- Application --.

Column 5,
Line 12, please delete "hemolymph solidified" and insert therein -- hemolymph is solidified --.

Signed and Sealed this

Twenty-ninth Day of October, 2002

Attest:

Attesting Officer

JAMES E. ROGAN
*Director of the United States Patent and Trademark Office*